United States Patent [19]

Fochtman et al.

[11] 4,402,836
[45] Sep. 6, 1983

[54] METHOD FOR TREATING CONTAMINATED WASTEWATER

[75] Inventors: Edward G. Fochtman, Elmhurst, Ill.; Roger L. Koch, Miami, Fla.; Forrest S. Forbes, Lancaster, Calif.

[73] Assignee: The United States of America as represented by the Secretary of the Air Force, Washington, D.C.

[21] Appl. No.: 445,886

[22] Filed: Dec. 1, 1982

[51] Int. Cl.³ .............................. C02F 1/32
[52] U.S. Cl. ..................... 210/748; 210/754; 210/903; 210/908; 204/158 HA
[58] Field of Search ............... 210/748, 754, 908, 903, 210/750, 755, 756; 204/158 HA

[56] References Cited

U.S. PATENT DOCUMENTS 3,649,493  3/1972  Merners et al. ............. 210/756 X
3,839,169 10/1974  Moyer ........................ 204/158 HA
4,056,469 11/1977  Eichenhofer et al. ........ 210/748

Primary Examiner—Thomas G. Wyse
Attorney, Agent, or Firm—Donald J. Singer; William J. O'Brien

[57] ABSTRACT

A method for treating hydrazine-fuel contaminated wastewater in which hydrazine, monomethyl hydrazine, unsymmetrical dimethyl hydrazine and dimethylnitrosamine pollutants are effectively decomposed at a controlled pH of about 5 by an ultraviolet induced chlorination treatment of the wastewater.

7 Claims, 6 Drawing Figures

METHOD FOR TREATING CONTAMINATED WASTEWATER

STATEMENT OF GOVERNMENT INTEREST

The invention described herein may be manufactured and used by or for the Government for governmental purposes without the payment of any royalty thereon.

BACKGROUND OF THE INVENTION

This invention relates to a method for treating fuel contaminated wastewater. In a more specific aspect, this invention concerns itself with the ultraviolet light catalyzed chlorinolysis of hydrazine fuel-contaminated wastewater.

Facilities are presently available for the blending of various hydrazines to produce fuels for rocket and missile applications. The primary operation of these facilities involves blending, such as the mixing of hydrazine ($N_2H_4$) with unsymmetrical dimethyl hydrazine (UDMH), cleaning of railway cars and storage tanks, as well as the cleaning and maintenance of production equipment and piping. During the manufacture, handling and storage of hydrazine based fuels, large amounts of fuel-contaminated wastewater are generated. Usually, the wastewater is transported to a pond, treated with hypochlorite to reduce the degree of contamination, and then pumped to a lake for permanent disposal. Oftentimes, however, the treated wastewater still contains several hundred parts per million of contaminants even though the hypochlorite was able to reduce the degree of contamination downwardly from the original degree of contamination which often exceeded 2800 ppm of hydrazine contaminants. As a consequence, the treated water still contained sufficient contaminants to constitute an environmental hazard. The hypochlorite treatment, therefore, is considered to be an unsatisfactory decontamination system. In addition to hydrazine contamination, the wastewater also contains low concentrations of dimethylnitrosamine (DMNA) which is present in UMDH fuel as an impurity and as an undesirable reaction by-product formed during exposure of UDMH to oxygen in the presence of light. The presence of monomethyl hydrazine (MMH), another fuel component, is also found to be present in wastewater emanating from rocket fuel production facilities.

It is particularly important, therefore, that a wastewater treatment system be developed that can effectively decontaminate wastewater contaminated by $N_2H_4$, DMNA, MMH and UDMA. The need for a treatment process that is safe, reliable, inexpensive and ecologically acceptable becomes obvious when one considers the environmental dangers involved in discharging contaminated wastewater into our surrounding environs. As a result of this need, a great deal of consideration and research effort has been given to a variety of physical and chemical decontamination treatment methods for the removal of UDMH, MMH, $N_2H_4$ and DMNA from wastewater. The particular methods researched, and the results achieved by resorting to such methods, all suffer some disadvantages. An outline of the prior art methods and their disadvantages with respect to the decontamination of UDMA, MMH, $N_2H_4$ and DMNA contaminated wastewater having at least 2800 ppm decontaminants are shown in Table I.

TABLE I

| TREATMENT OF HYDRAZINE-CONTAINING WASTE WATERS | | | | |
|---|---|---|---|---|
| Treatment Method | MMH | UDMH | $N_2H_4$ | DMNA |
| Ozone Oxidation | destroys destroys | Makes DMNA destroys—makes colored reaction product | *N.D. N.D. | no reaction no reaction |
| Biological Degradation | Max. 10 ppm | Max. 10 ppm | N.D. | Max. 10 ppm |
| Carbon Adsorption | Very little adsorption | Very little adsorption | N.D. | Very little adsorption |
| NaOCl | poor at high pH OK at low pH | OK at all pH's | N.D. | N.D. |
| $H_2O_2$ Chloride | destroys erratic results at high pH; OK low pH | Makes DMNA OK at all pH's | N.D. OK at all pH's | N.D. OK at low pH with large excess of chlorine |
| Chlorine and UV light | OK at all pH's | OK at all pH's | N.D. | OK at all pH's |

*N.D.—not determined

These results indicate that chlorine will readily react with all four substances at low pH in the presence of an excess of chlorine. The major shortcoming of the systems studied, however, was their inability to decompose DMNA. DMNA was in fact produced by the reaction of UDMH with ozone and peroxide. Therefore, it was concluded that chlorinolysis of the wastewater could only be accomplished at low pH. Unfortunately, decontamination procedures that operate at a low pH of about 1.5 have a deleterious and corrosive effect on equipment and piping and require extensive neutralization procedures before disposing of the treated hydrazine contaminated wastewater.

In further attempts at providing a solution to the problem of decontaminating hydrazine containing wastewater, as well as attempting to comply with the objections of treating wastewater containing specific contaminants of about 1–100 ppm DMNA, 50–500 ppm MMH, 100–3000 ppm UDMH, and 100–3000 ppm $N_2H_4$, it was unexpectedly found that a solution to the aforestated problem could be provided by a treatment method which involves the ultraviolet light (UV) induced chlorination of contaminated wastewater at a controlled pH of about 5. This procedure, conducted at a reasonably high pH, also overcomes the corrosion problems encountered when using the low pH methods of the past. The wastewater treatment system of this invention has been found to be capable of discharging a decontaminated wastewater to a sanitary wastewater system with a maximum of only 0.1 ppm of each of the four pollutants, MMH, UDMH, $N_2H_4$ and DMNA. It has been established that these materials are biodegraded when in concentrations of less than 10 ppm. Thus, the effluent from the sanitary wastewater system of this invention will be well below current detection limits and will not present a toxic or ecological hazard.

SUMMARY OF THE INVENTION

The present invention concerns itself with a novel treatment method for decontaminating wastewater containing hydrazine, having the formula HHMMHH, ($N_2H_4$); monomethyl hydrazine, having the formula $CH_3HNNH_2$, (MMH); unsymmetrical dimethyl hydrazine, having the formula $(CH_3)_2NNH_2$, (UDMH); and dimethylnitrosamine, having the formula $(CH_3)_2NNO$; (DMNA) pollutants. In general, the method involves the ultraviolet light induced chlorination of the wastewater at a controlled pH of about 5. The process of the invention utilizes a large holding tank for the contaminated wastewater, a chlorinolysis reactor and chlorine addition system, a nitrogen stripping system, a pH control system, and a $Na_2S_2O_3$ neutralization system. The treated effluent is then discharged to a holding pond and may then go to a biological treatment facility, to land spreading, or to a waterway without the attendant environmental hazards encountered with previously known wastewater treatment procedures.

Accordingly, the primary object of this invention is to provide a system which will decompose $N_2H_4$, MMH, UDMH and DMNA pollutants contained in wastewater generated by hydrazine manufacturing systems, cleaning operations, and small accidental production spills.

Another object of this invention is to provide an ultraviolet light induced chlorinolysis wastewater treatment system operable at reasonably high pH levels of about pH 5.

The above and still other objects and advantages of the present invention will become more readily apparent upon consideration of the following detailed description thereof when viewed in conjunction with the accompanying drawings.

Figure 2:
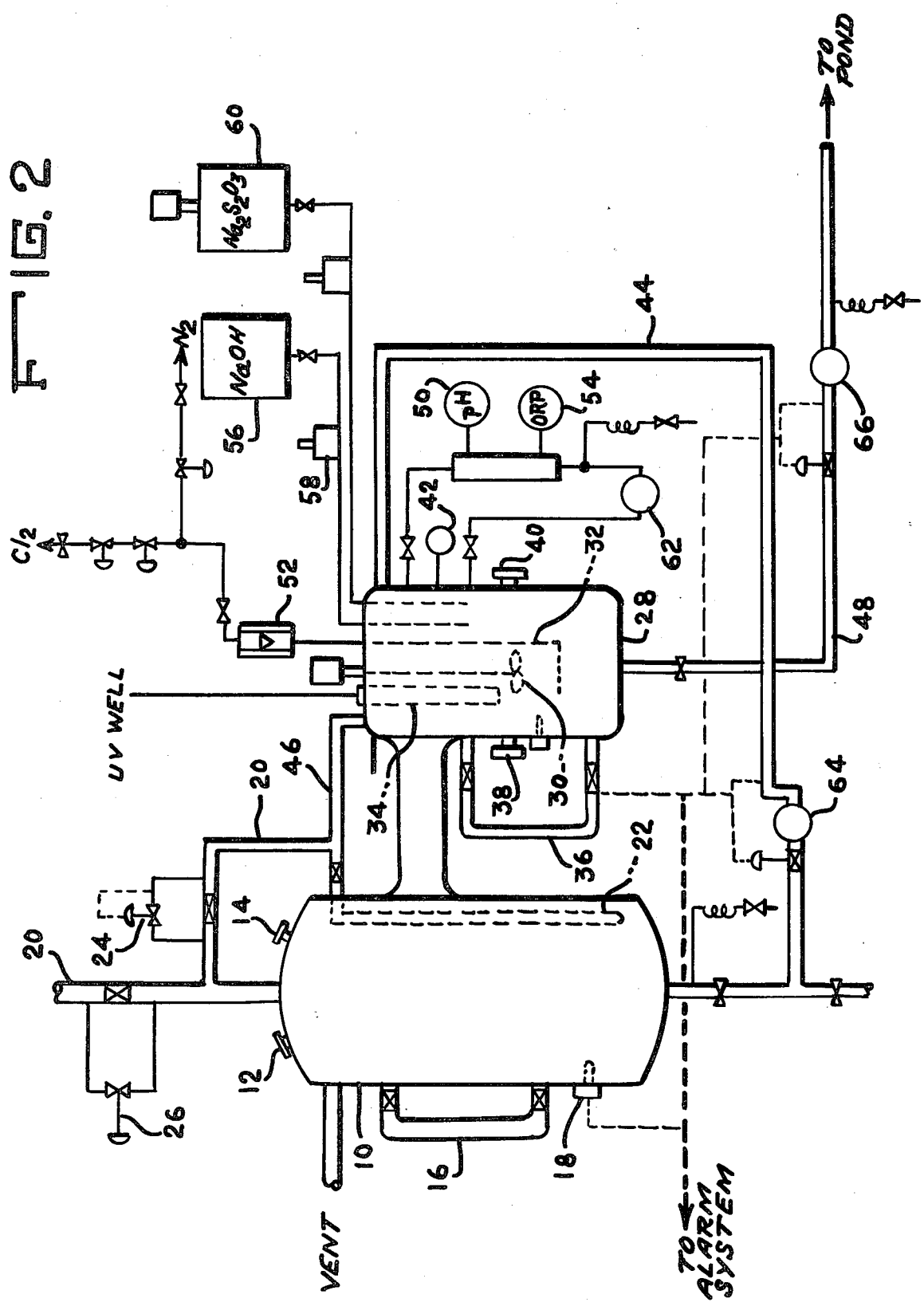
Figure 3:
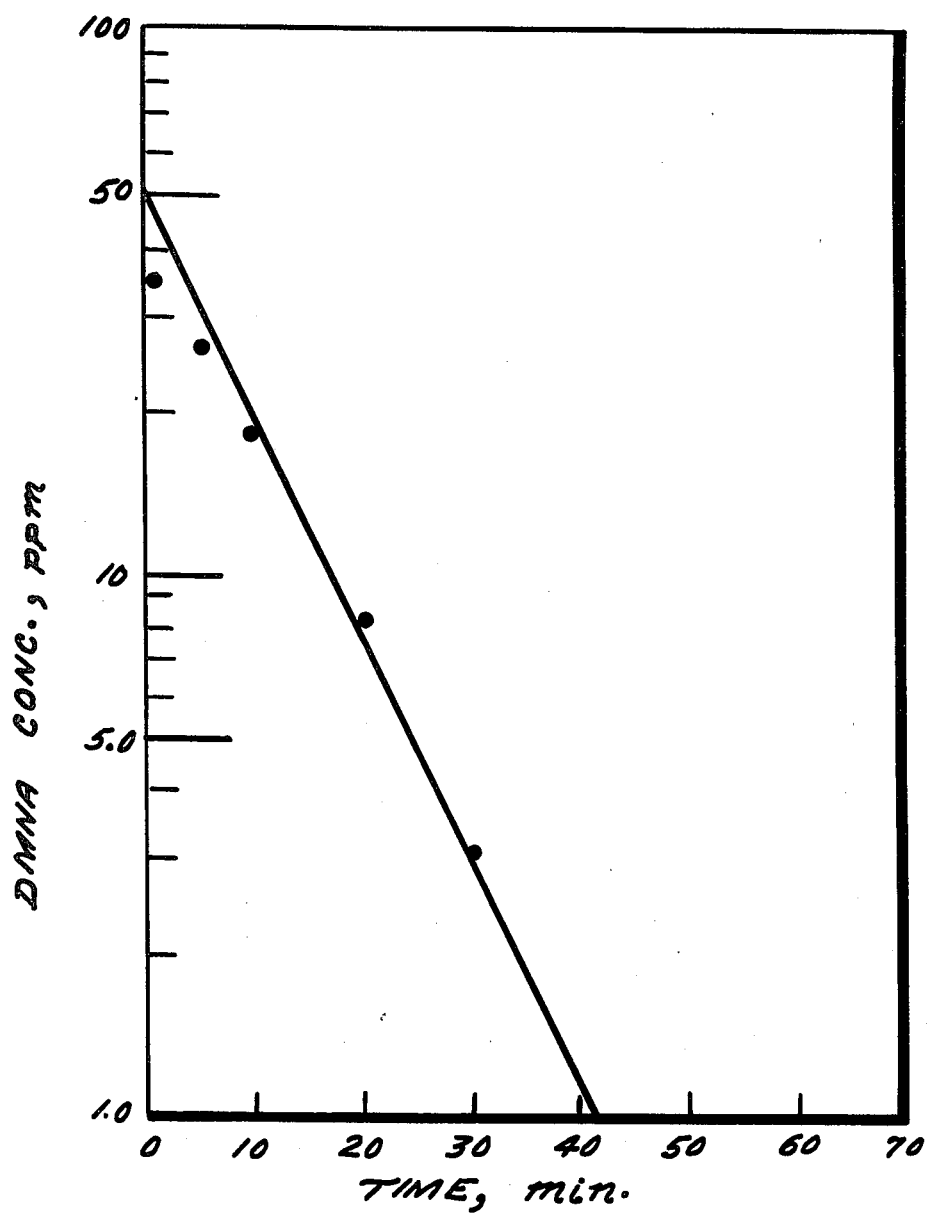
Figure 4:
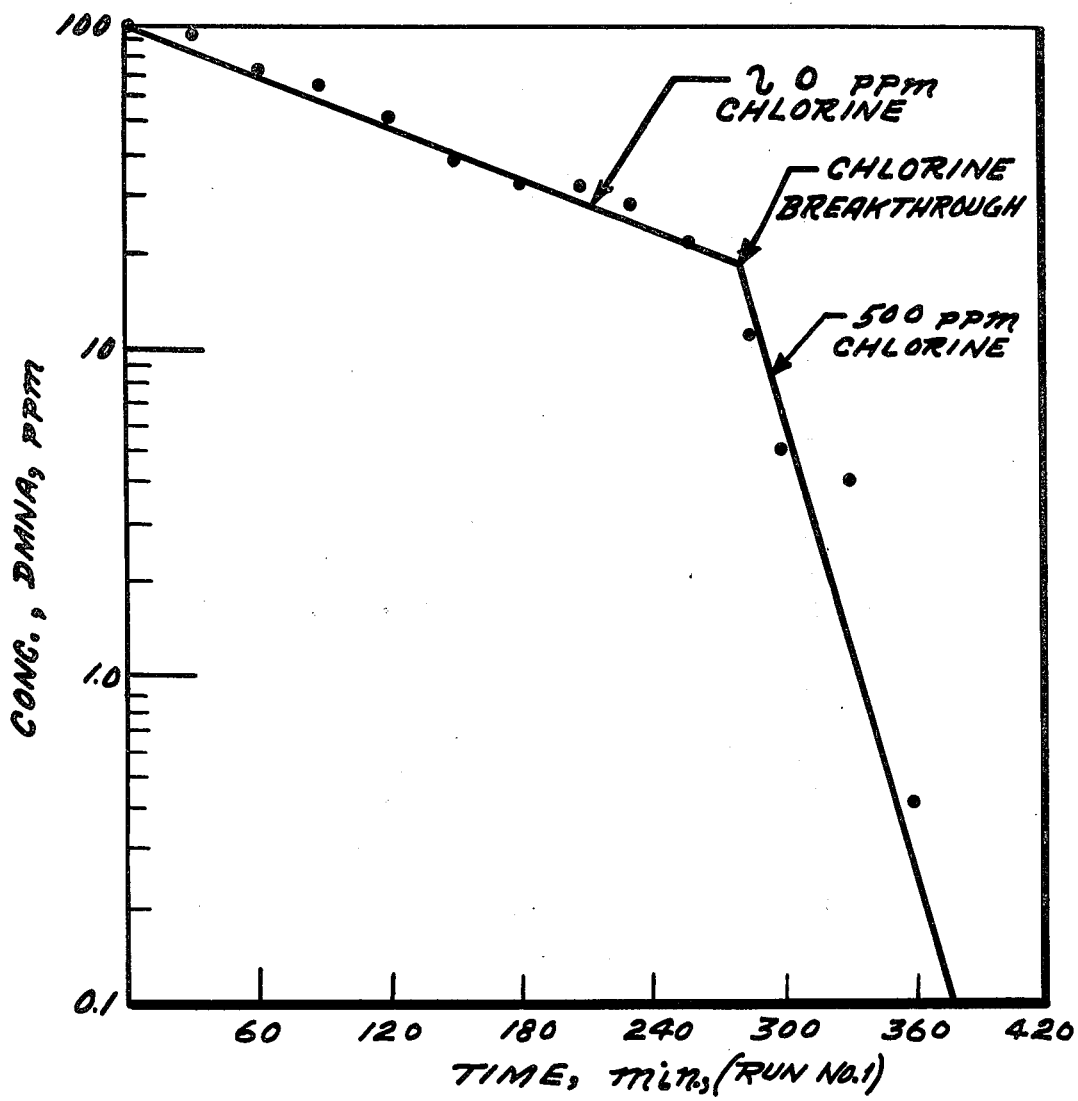
Figure 5:
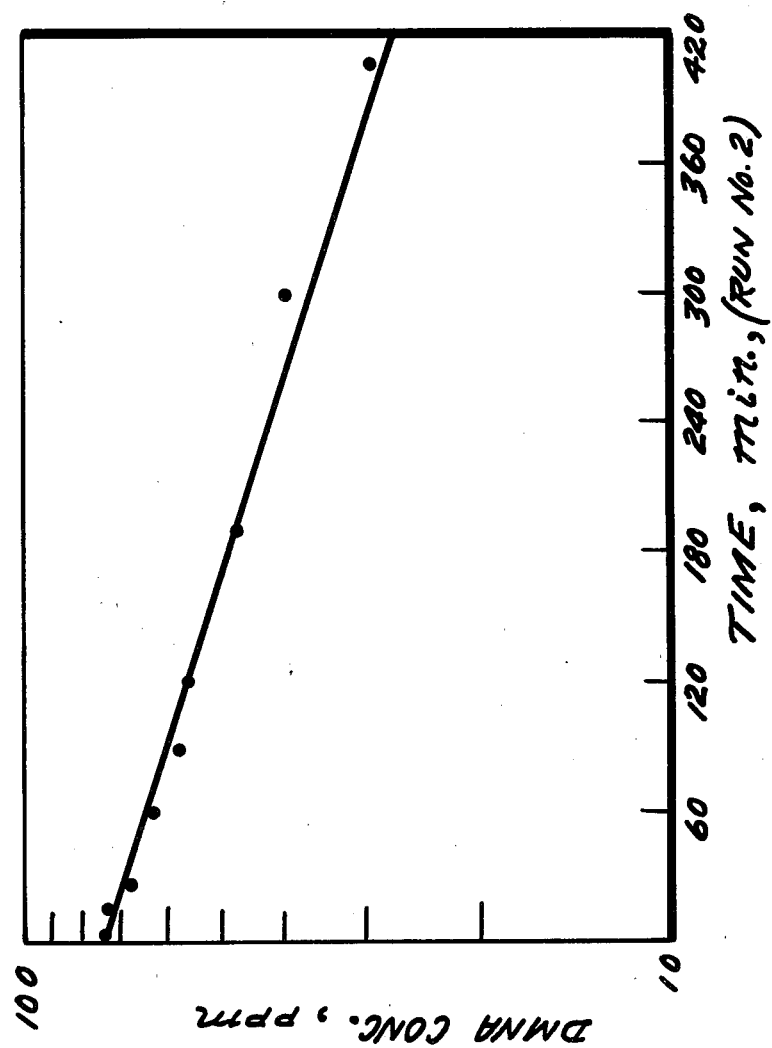
Figure 6:
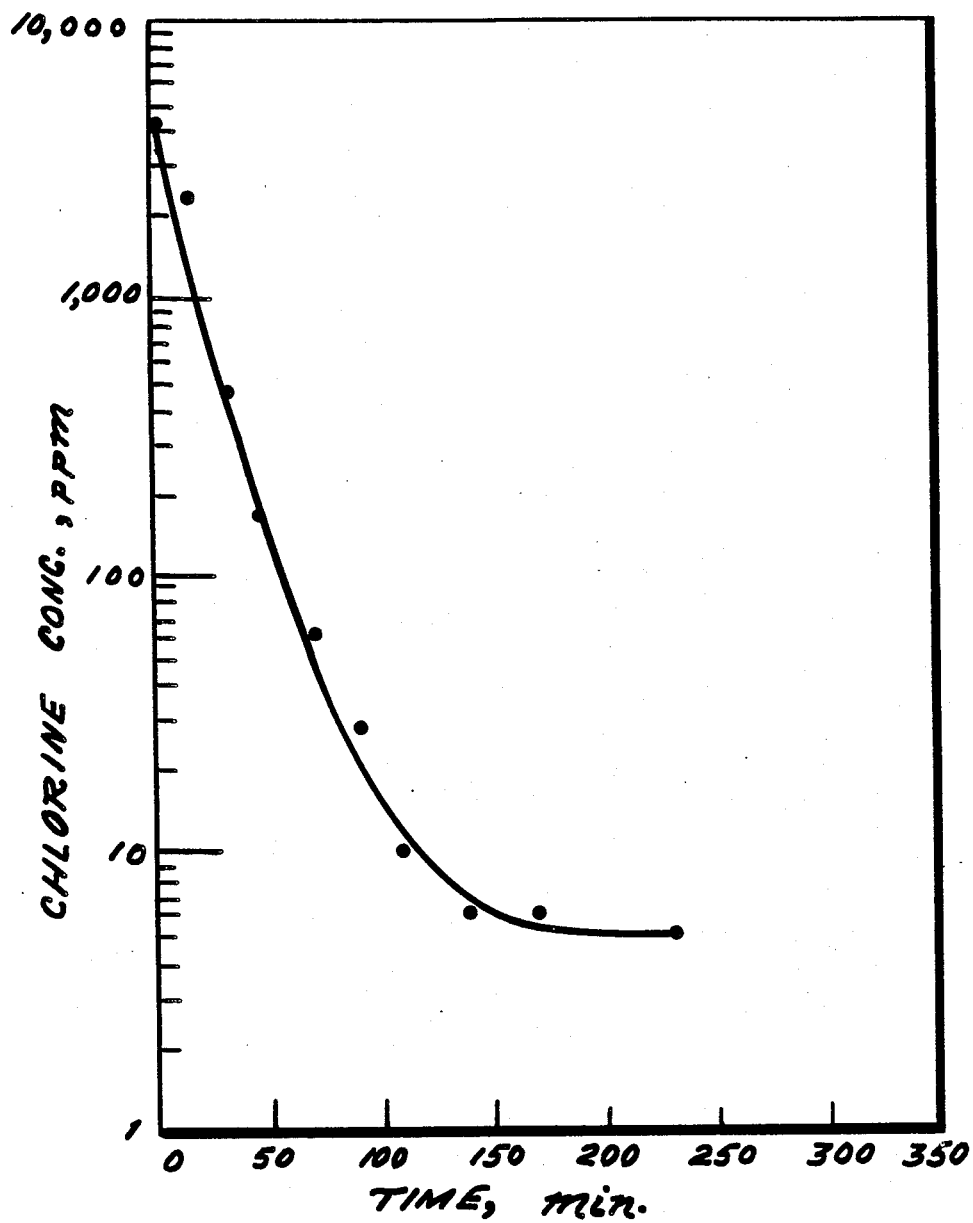

The FIG. 2 represents, in schematic form, a chlorinolysis reactor system for treating hydrazine fuel contaminated wastewater in accordance with the concepts of this invention;

FIGS. 3, 4, and 5 are graphs showing test results obtained by using the UV chlorinolysis treatment system of this invention; and FIG. 6 is a graph showing the effects of nitrogen stripping as a means of dechlorination.

DESCRIPTION OF THE PREFERRED EMBODIMENT

Pursuant to the above-defined objects, the present invention concerns itself with a treatment system for decontaminating wastewater containing $N_2H_4$, MMH, UDMH and DMNA pollutants present in undesirable amounts. The objects of this invention are accomplished by the ultraviolet light (UV) induced chlorination of the wastewater which affects the decomposition of the pollutants. The UV-chlorination induces a chlorine reaction with the contaminants at a relatively high pH level such that the treated wastewater effluent contains less than 0.1 ppm of the undesirable pollutants.

With previously known treatment systems, it was found that the reaction between chlorine and the hydrazines was very fast at a low pH level of from 1.5–3. In addition, the complete reaction of $Cl_2$ and DMNA required either a large excess of $Cl_2$ or a pH of 1.5 to 3. However, a large residual excess of chlorine presented a problem in disposal of treated wastewater and an excessive chlorine usage. Also, operation at low pH enchanced the possibility of nitrogen trichloride formation with its attendant explosive hazards and presented control instrument problems since commercially available instruments required a pH of about 5 for long term stable operation. With this invention, however, those problems are overcome by the method of this invention which utilizes ultraviolet light to increase the chlorinolysis reaction rate at a high pH level.

Studies of the effect of light intensities on reaction rates indicates a light intensity of 1 watt/liter is 20 times as fast as a light intensity of 0.1 watts/liter. At a light intensity level of approximately 1 watt/liter and a chlorine concentration of 500 ppm, the concentration of DMNA decreased by one order of magnitude in 60 minutes.

In the UV induced chlorinolysis process of this invention, the chlorine reacts with the contaminants according to the following reactions schemes:

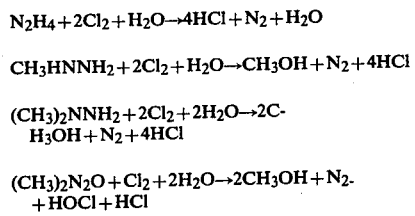

Thus, these equations indicate that four equivalents of Cl (2 moles of $Cl_2$) are required for each mole of the three hydrazines and two equivalents of Cl for each mole of DMNA.

It was found also that the chlorinolysis reaction was affected by variables such as pH, temperature, chlorine concentration, and the concentration of the hydrazine components. In addition, DMNA was found to be resistant to high pH chlorinolysis. Test results indicated that this reaction proceeded at a rate sufficient for use in a reactor system only at low pH and with a high chlorine concentration. However, it is not particularly desirable to perform the reaction at low pH since $NCl_3$, an explosive compound, is reported to form from the reaction of chlorine with $NH_3$. Small amounts of $NH_3$ are expected to be present in the wastewater since $NH_3$ is one possible decomposition product of $N_2H_4$, MMH, and UDMH. Therefore, it became necessary to develop an alternative to the low pH chlorination systems relied upon heretofore.

In accordance with this invention, it was found that ultraviolet light (UV) induced chlorination was an effective method for decomposing DMNA as well as MMH, UDMH and $N_2H_4$. This method was proven by an experiment in which a 100 watt medium pressure Hg lamp was inserted in a two liter reactor. Solutions of DMNA and chlorine were prepared at concentrations of 110 ppm and 665 ppm respectively and adjusted to pH 5. These solutions were added to the reactor and exposed to the UV lamp. The concentration of DMNA was followed with time. The results of this experiment are recorded in FIG. 3. They show that a 50 fold decrease in DMNA concentration was achieved in 40 minutes. A similar reduction in the DMNA concentration in the absence of UV light at this same pH would have required days. These results indicated that UV chlorination can be successfully performed above the pH at which the formation of $NCl_3$ is reported to occur.

Two major questions were not answered by the UV experiment mentioned above. The first is: what wavelength of light should be used? The second is: how much UV light is required? The choice of the best UV source was a difficult question to resolve. First the decision had to be made whether to try to catalyse the reaction by activating the chlorine species or by activating the DMNA. The spectra of the medium and low pressure Hg lamps shows that the medium pressure Hg lamp produces a preponderance of radiation of wavelengths 3000–6000 Å, while the low pressure lamp produces primarily 2537 Å radiation. Chlorine is known to be activated by radiation of 3000 to 3600 Å.

When chlorine is activated with UV light in the presence of $H_2O$, it will form HCl. This will increase chlorine consumption in the reactor and thus increase operating costs. Therefore, it is desirable to activate DMNA rather than chlorine in a UV chlorinolysis reactor. This requires the use of a low pressure Hg lamp. Experiments with low pressure Hg lamps were performed as follows.

The first low pressure Hg experiment was performed at a radiation level of 0.9 watts/liter. The experiment was performed at pH 5. A solution containing 500 ppm of $N_2H_4$, MMH, and UDMH and 100 ppm DMNA was added to the reactor. Chlorine was added to the reactor at a low flow rate to allow pH control to ±0.1 pH unit. The UV light was placed in the reactor from the start of the experiment. The MMH, UDMH, and $N_2H_4$ reacted rapidly with the chlorine keeping the chlorine below detectable levels in the reactor throughout the first phase of the experiment. When these three compounds were consumed, the chlorine concentration began to increase. The chlorine concentration was then brought to 500 ppm and held at that level for several hours. Samples were taken during the course of the experiment and analyzed by capillary gc. The curve of the DMNA concentration vs. time is shown in FIG. 4. This graph shows a great increase in the DMNA reaction rate upon the appearance of chlorine in the reactor. The rate of this reaction is somewhat slower than the rate of the UV chlorinolysis experiment with the 100 watt UV light. It was not possible to say whether this effect was due to the different wavelength, lower intensity, or both. However, the results do indicate that a successful reaction can be carried out with a low pressure Hg lamp at a radiation level of 0.9 watts/liter.

The second low pressure Hg lamp experiment was performed at a UV level of 0.1 watts/liter. Ten liters of 100 ppm DMNA solution was exposed to 0.1 watt of UV light in the presence of 600 ppm chlorine. Samples were taken at the desired times, quenched with $Na_2S_2O_3$, and analyzed by capillary gc for DMNA. The results of this experiment are shown in FIG. 5.

A comparison of FIGS. 4 and 5 shows that the reaction rate is affected by the UV light level. The reaction rate constants obtained from the slopes of FIGS. 4 and 5 were $3.75 \times 10^{-5}$ $sec^{-1}$ ppm $Cl^{-1}$ and $1.76 \times 100^{-6}$ $sec^{-1}$ ppm $Cl^{-1}$ respectively. These values indicate that a reation with 0.9 watts/liter of UV light would proceed approximately 20 times faster than a reaction with only 0.1 watts/liter.

The chlorinolysis process of this invention has been shown to be effective in reducing $N_2H_4$, MMH, UDMN and DMNA to very low concentrations at low pH with excess chlorine. In the presence of UV light, decomposition of these four pollutants takes place at a pH of 5 or higher. This was confirmed by an experiment in which sample reaction products from a UV chlorinolysis reaction conducted at pH 5 were analyzed by gc for chlorinated hydrocarbons and amines. These compounds could be formed by the chlorinolysis of $NH_3$, $CH_4$ or $CH_3OH$. These three compounds are possible side products of the reaction of $N_2H_4$, MMH, UDMN, and DMNA with chlorine. $CH_3OH$, in particular, is expected to be a primary reaction product of the chlorinolysis of both MMH and UDMN.

If these compounds react with chlorine they could form: $CH_3Cl$, $CH_2Cl_2$, $CHCl_3$, $CCl_4$, $NH_2Cl$, $NHCl_2$ and $NCl_3$. $NCl_3$ is the most undesirable of these since it is explosive. The other compounds are all toxic and, therefore it was of interest to know how much of each of these components would be formed.

The following procedure was used to analyze for the chlorinated carbon compounds. The instrumentation for this analysis was an Aerograph 1520 gas chromatograph with a thermal conductivity detector coupled to a Tekmar Liquid Sample Concentrator LSC-1 with a 25 ml sample tube. The Tekmar LSC-1 was fitted with a trap packed with Chromosorb 103. The gas chromatograph column was ⅛ in. ×20 ft stainless steel packed with 3% Carbowax 20M on a 100/120 mesh diatomaceous earth support. The column oven temperature was maintained at 75° C. A flow rate of 15 ml/min was maintained using high purity helium carrier gas.

The analysis was performed by analyzing the purgable materials contained in the treated wastewater samples. A 25 ml sample was purged with 15 ml/min high purity helium for 30 min. The purgeable materials and helium were passed through ⅛ in. ×20 cm stainless steel tube packed with 60/80 Chromosorb 103 at room temperature.

After the 30 min purge time, the trap column was heated to 175° C. and the thermally desorbed materials were swept into the GC column by helium carrier gas. Good separations of all of the chlorinated methanes and chlorine were obtained. A sensitivity of 0.3 ppm of each component in aqueous solution was achieved.

Samples of the end products from two pilot plant chlorinolysis reactions with no UV light and end products of the UV chlorinolysis reaction of this invention were analyzed by the above procedure. The results of this analysis are disclosed in Table II and show that significant amounts of chlorinated contaminants remained in the pilot plant treated wastewater. However, no contaminants were found in the end product of the UV chlorinolysis experiment. This illustrates that UV chlorinolysis possesses a distinct advantage over pH 5 chlorinolysis in that it produces a much cleaner effluent.

TABLE II

CHLORINOLYSIS END PRODUCT ANALYSIS BY G.C.

| | Concentration, ppm | | | | |
|---|---|---|---|---|---|
| | $CH_3Cl$ | $CH_2Cl_2$ | $CHCl_3$ | $CCL_4$ | Unk. #465 |
| Pilot Plant Run #1 end product | 1-2 | 0 | 10.71 | 6.3 | 15 |
| Pilot Plant Run #2 end product | 0 | 0 | 5.3 | 1.8 | 5 |
| UV Chlorinolysis Run #2 end product | 0 | 0 | 0 | 0 | 0 |

The treatment conditions for the UV chlorinolysis reaction of Table II are the same as those utilized in the experiment which produced the results outlined in FIG. 5 while Table III, which follows, outlines the treatment conditions for the two chlorinolysis pilot plant runs of Table II.

TABLE III

PILOT PLANT CHLORINOLYSIS REACTION RUNS (RUN CONDITIONS)

| concentration, ppm | | | | Initial Temp. °F. | pH | $Cl_2$ Flowrate liters/ minutes |
|---|---|---|---|---|---|---|
| $N_2H_4$ | UDMH | MMH | DMNA | | | |
| | | | Run #1 | | | |
| 1000 | 1000 | 1000 | 100 | 77 | 5.0 | 2 |
| | | | Run #2 | | | |
| 500 | 500 | 500 | 100 | 77 | 5.0 | 2 |

The final step in the procedure for the UV chlorinolysis of the wastewater requires a chlorine concentration of approximately 300 ppm. The concentration of chlorine must be reduced to less than 0.5 ppm prior to discharge to a biological treatment system or it could have a toxic effect on the treatment plant micro-organisms. This can be accomplished by chemical neutralization through the addition of an excess of $Na_2S_2O_3$ to the finished reactor products.

The products of the reaction of $Na_2S_2O_3$ with $Cl_2$ are NaCl, $Na_2S_4O_6$, $NaHSO_4$ and HCl. These products are harmless to common biological organisms in the concentration range of this application. $Na_2S_2O_3$ is itself an innocuous material, so it can be added in slight excess to assure that complete dechlorination is achieved prior to discharge of the reactor products to the biological treatment facility.

No precipitates were observed upon neutralization of $Cl_2$ solutions of 50 ppm or less; above 100 ppm a slight precipitate was observed when the sample was cooled to 5° C. Therefore, it is recommended that $Na_2S_2O_3$ not be used to neutralize $Cl_2$ solutions containing greater than 50 ppm $Cl_2$.

The dechlorination procedure of this invention makes use of the procedure referred to above as well as nitrogen stripping. This is recommended to decrease the residual chlorine from 300 ppm to 50 ppm. This will avoid the formation of any precipitates from the reaction of $Na_2S_2O_3$ with chlorine. At this point, $Na_2S_2O_3$ neutralization is recommended. This neutralization is carried out to a slight excess of $Na_2S_2O_3$ which will insure comlete removal of the residual chlorine.

Nitrogen stripping was conducted on the reaction products from the UV chlorinolysis treatment procedure of this invention and the results are shown in FIG. 6. They indicate that stripping is effective in reducing the chlorine concentration to about 10 ppm. After nitrogen stripping, the treated wastewater is neutralized by adding the $Na_2S_4O_6$ referred to above to reduce the chlorine concentration to less than 0.5 ppm before discharging the treated wastewater to a biological treatment facility holding pond or waterway for disposal.

Figure 1:
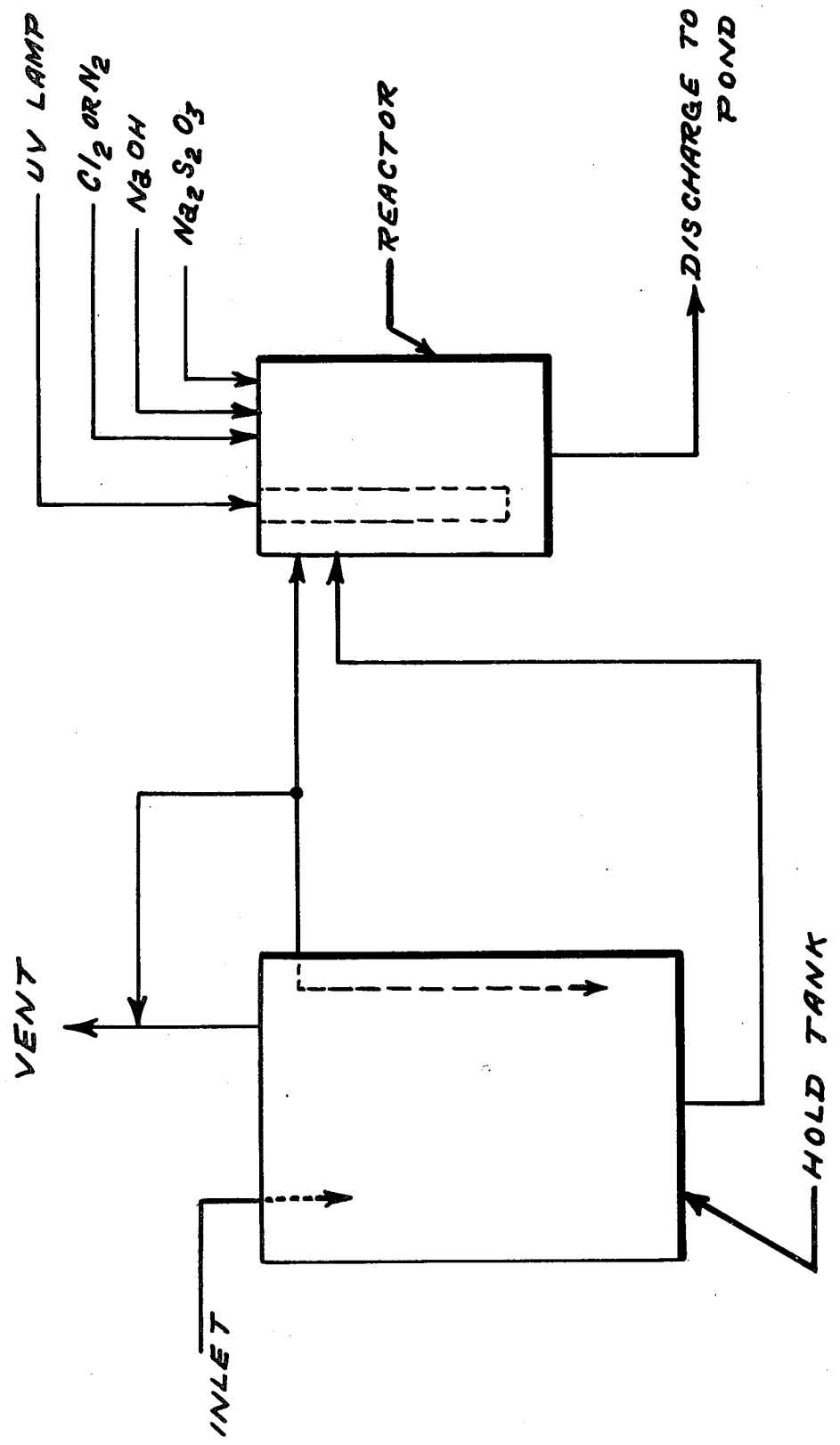
FIG. 1 represents a process flow sheet for the UV chlorinolysis reactor system of this invention.

A process flow sheet illustrating the method of this invention is sown in FIG. 1. The process uses a 10,000 gallon hold tank, a chlorinolysis reactor, a chlorine addition system, a nitrogen stripping system, a pH control system, and a $Na_2S_2O_3$ neutralization system. The effluent is discharged to a holding pond and a biological treatment facility.

The 10,000 gallon hold tank is used to collect the wastewater and to level out variations in the concentration for more consistent day-to-day operation of the facility. The chlorinolysis reactor is used to treat the contaminated wastewater in 2000 gallon batches. $Cl_2$ is supplied as a gas to the reactor. pH control is maintained by the addition of 50 percent NaOH during the chlorinolysis reaction. After the reaction is completed the excess chlorine is air stripped to less than 100 ppm. The residual chlorine is neutralized with $Na_2S_2O_3$ at this point. The pH is then adjusted up to 7.0 and the reactor contents are discharged to a holding pond. This pond is sampled periodically for hydrazines and is then pumped to a biological treatment facility.

The major components of a reactor system suitable for use with this invention are shown in FIG. 2 and are described in detail. A wastewater holding tank 10 is sized at 10,000 gallons. This tank is constructed of FRP using Dow Derakane 470-36 resin. It is equipped with two sight glasses 12 and 14, a liquid level sight glass 16, a liquid level dp (differential pressure) cell 18 connected to a high level alarm not shown, a vent line 20, and a sparger 22 which bubbles the reactor vent gases through the wastewater in the holding tank.

This tank should not be operated above 120° F. nor below 40° F. The tank should never be pressurized, therefore, care must be taken to insure that the vent lines 20 are open at all times during operation. Pressure relief valves 24 and 26 were placed in the vent system to guard against this possibility.

The chlorinolysis reactor 28 is a 2000 gallon glass lined reactor vessel. This reactor is the heart of the treatment system. It is equipped with an agitator 30 and a sparger 32 to insure good reactant mixing and contact. A UV light 34 is immersed in the reactor to activate the chlorinalysis reaction; 7500 watts of low pressure Hg lamp UV light are required.

Other features include a liquid level sight glass 36, two sight glasses 38 and 40 on opposite sides near the bottom of the reactor, a dp liquid level transmitter 42, vent 52, overflow line 44, inlet 46, and discharge line 48.

The pH and chlorine concentration of the reactor contents must be carefully monitored and controlled. An oxidation-reduction potential (ORP) system, has been determined to be best suited for chlorine control. The pH 50 and ORP 54 probes are placed in an external recirculation loop. Care must be taken to insure that an adequate flow to the probes is maintained.

This reactor will operate at atmospheric pressure and the temperature in the reactor should not exceed 125° F. A high temperature alarm and control system is installed to prevent a temperature excursion should very high concentrations of hydrazine be introduced to the reactor.

The chlorine addition system is controlled by the ORP instrument 54 located in the reactor recirculation loop. Control valves are installed in the supply line to turn the chlorine flow on and off as required. The valves, piping, and sparger are constructed of stainless steel or FRP.

The same sparger system will be used for $N_2$ stripping operation as for the chlorinolysis system. Only two extra valves and some extra piping are required. Nitrogen is assumed to be available at 30 psig at 10 ft$^3$/min.

A caustic addition system is used for pH control which is required for the chlorinolysis reaction. The pH control system 50 requires a supply tank 56 for the NaOH solution used to maintain pH control, a metering pump 58, valves and plumbing. The caustic hold tank is constructed of Dow Derakane FRP. The valves and piping can be constructed of PVC or stainless steel. The metering pump 58 suggested is a 1.0 gpm Milton Roy metering pump. The $Na_2S_2O_3$ addition system 60 is the same size and will be constructed of the same materials as the NaOH addition system.

One reactor recirculation pump 62 and two fluid transfer pumps 64 and 66 are required for fluid transfer. The recirculation pump 62 must supply 15 gpm through the instrumentation loop.

The two fluid transfer pumps 64 and 66 are required to fill and empty the reactor. Both pumps require a capacity of 40 gpm. All three are constructed of FRP with a vinyl ester resin. All three pumps will have double mechanical seals to prevent wastewater leakage into the operating area.

Although the present invention has been described by reference to a specific embodiment thereof, it should be understood by those skilled in the art that the invention is capable of a variety of alternative embodiments and that all such embodiments as are encompassed within the scope of the appended claims are intended to be included herein.

What is claimed is:

1. A method for treating fuel-contaminated wastewater containing hydrazine, monomethyl hydrazine, unsymmetrical dimethyl hydrazine and dimethylnitrosamine pollutants which comprises the steps of:
   (A) agitating said contaminated wastewater;
   (B) adjusting and maintaining said agitated wastewater at a predetermined temperature and pH;
   (C) passing chlorine gas through said agitated wastewater while simultaneously irradiating said chlorine-treated wastewater for a period of time and at a chlorine flow rate and degree of irradiation sufficient to effect the decomposition of said pollutants;
   (D) reducing the residual chlorine concentration of said chlorine-treated wastewater;
   (E) dechlorinating said chlorine-treated wastewater to remove any residual chlorine therefrom; and
   (F) adjusting the pH of said chlorine-treated wastewater to a neutral pH followed by disposal of the decontaminated wastewater.

2. A method in accordance with claim 1 wherein said wastewater is maintained at a temperature ranging from about 40° to 125° C. and a pH of about 5.

3. A method in accordance with claim 1 wherein said chlorine gas is passed through at a flow rate of about two liters per minute and said degree of irradiation is maintained at about 0.1 to 1.0 watts per liter for a period of about two to three hours.

4. A method in accordance with claim 3 wherein said chlorine-treated wastewater was irradiated at about 0.9 watts per liter.

5. A method in accordance with claim 3 wherein said chlorine-treated wastewater was irradiated at about 0.1 watts per liter.

6. A method in accordance with claim 1 wherein the chlorine concentration of said chlorine-treated wastewater is reduced to about 50 ppm by passing nitrogen therethrough.

7. A method in accordance with claim 6 wherein said chlorine-treated wastewater is dechlorinated by adding excess $Na_2S_4O_3$ to remove any residual chlorine and adjusted to a pH of about 7 before subsequent disposition to a disposal facility.

* * * * *